United States Patent [19]

Woods

[11] Patent Number: 4,613,262

[45] Date of Patent: Sep. 23, 1986

[54] DRILL MOTOR ASSEMBLY WITH GIMBAL NORMALITY AND CLAMP-UP CAPABILITY

[75] Inventor: Quentin T. Woods, Redmond, Wash.

[73] Assignee: The Boeing Company, Seattle, Wash.

[21] Appl. No.: 687,520

[22] Filed: Dec. 28, 1984

[51] Int. Cl.$^4$ .............................................. B23B 39/14
[52] U.S. Cl. ..................................... 409/211; 408/88; 408/236; 409/216
[58] Field of Search ...................... 408/95, 97, 98, 100, 408/101, 137, 236, 88, 89, 111, 112; 409/211, 212, 216

[56] References Cited

U.S. PATENT DOCUMENTS

| | | | |
|---|---|---|---|
| 1,881,185 | 10/1932 | Hazelton | 408/95 |
| 2,357,579 | 9/1944 | Conway | 408/111 |
| 2,640,515 | 6/1953 | Johnson | 144/92 |
| 2,891,427 | 6/1959 | Warsap et al. | 408/111 |
| 3,259,023 | 7/1966 | Rieger et al. | 90/13.5 |
| 3,469,475 | 9/1969 | Watt | 77/4 |
| 3,552,069 | 1/1971 | Butler | 408/89 |
| 3,565,142 | 2/1971 | MacQueston | 144/112 |
| 3,884,122 | 5/1975 | Chernov et al. | 90/58 |
| 4,198,180 | 4/1980 | Schultz | 408/9 |
| 4,251,174 | 2/1981 | Satler | 409/137 |
| 4,254,676 | 3/1981 | Wilson | 82/34 |
| 4,304,512 | 12/1981 | Vierstraete | 409/80 |
| 4,310,269 | 1/1982 | Neu et al. | 408/11 |

FOREIGN PATENT DOCUMENTS 2019269 10/1979 United Kingdom ................. 408/95

Primary Examiner—Frank T. Yost
Assistant Examiner—Hien H. Phan
Attorney, Agent, or Firm—Bruce A. Kaser

[57] ABSTRACT

The present invention provides a drilling apparatus (10) having a drilling member (20) that is rotatable about an axis (45) for drilling a bore in a workpiece (12). The drilling apparatus (10) includes a spindle (22) which drives the drilling member (20) and advances it towards and against the workpiece surface (32). The gimbal member (18) normalizes the drilling member (20) as the bore is drilled. The gimbal member (18) guides the drilling member (20) toward a drilling point (48) which is positioned on a datum plane (44) that is substantially tangent to the surface of the workpiece (32). As the bore is drilled, the guiding member (18) guides the drilling member (20) so that the drilling axis (45) remains substantially normal to the drilling point (48) at all times while the bore is drilled.

9 Claims, 8 Drawing Figures 4,613,262

DRILL MOTOR ASSEMBLY WITH GIMBAL NORMALITY AND CLAMP-UP CAPABILITY

DESCRIPTION

1. Technical Field

This invention relates to drills and the like. More particularly, it relates to normalizing a drill bit relative to the surface of a workpiece in which a bore is to be drilled.

2. Background Art

This invention relates to problems associated with drilling a bore normal to the surface of a workpiece. For example, common drill presses have a fixed spindle axis that is perpendicular or normal to a horizontal drill table. Typically, a workpiece may be secured to the drill table by either a vise or similar fixture which makes up a portion of the table. The workpiece or other part to be drilled may or may not be positioned at a right angle to the drill spindle axis. In such a case, the workpiece must be positioned in the vise so that the workpiece surface is perpendicular to the spindle axis. This practice is, of course, time consuming and expensive. The problem becomes magnified when the workpiece has a curved surface because it is extremely difficult to get the curvature oriented so that the bore will be drilled normal to the surface. Further, when a series of holes are to be drilled into a workpiece having a compound curved surface the angular displacement of the drill axis is different for each hole. In addition, the depth of drill feed necessary to establish a countersink depth may be different for each hole for a pattern of holes in a common workpiece surface. These two angularity and depth problems are chronic to a traversing drilling head that is positioned by programmed controllers.

A problem especially pertinent to drilling bores in curved surfaces is that often times the drill bit may tend to skid across the surface as it begins to drill a particular bore. In the past, drill point skidding has sometimes been prevented by providing a drill bushing that is connected to the vise or similar fixture.

Another problem associated with drilling bores in curved surfaces is that common drill presses, for example, provide no easy means of reference for measuring hole or bore depth registration from the workpiece surface. This is important for bores having a fixed depth wherein such bores are not drilled through the entire thickness of the workpiece. For example, in such bores as countersink bores, stepped drilled bores, counterbores, and any other blind (not through) bores it is important to have a reference plane for measuring and controlling bore depth.

As will become apparent upon reading further portions of this application, the present invention both addresses and eliminates the above-stated problems.

DISCLOSURE OF THE INVENTION

The present invention provides a drilling apparatus for drilling a bore in a workpiece, wherein the bore is drilled substantially normal to the surface of the workpiece. In basic form, the apparatus comprises a drilling member or bit that is rotatable about an axis for drilling the bore. A drive means is included for rotating the bit and for advancing it toward and against the workpiece surface to drill the bore. A gimbal means, connected to the drive means, normalizes the bit as the bore is drilled. The gimbal means guides the bit toward a drilling point on the surface of the workpiece, wherein the drilling point is positioned substantially tangent to the surface of the workpiece. The bit is guided so that the bit's drilling axis remains substantially normal to the drilling point while the bore is drilled.

The drilling apparatus includes an inner housing that receives the drive means and which supports the drilling bit. An outer housing surrounds the inner housing. A gimbal member connects the inner housing to the outer housing so that the inner housing may pivot relative to the outer housing, which in turn causes the drilling axis to pivot relative to the outer housing.

The gimbal member is fixedly connected to the inner housing and has a plurality of pressure feet which abut against the surface of the workpiece. The pressure feet are arranged so that they are equidistant from each other with the drilling axis being positioned centrally with respect to them. The pressure feet and the surface of the workpiece define a drill datum plane that intersects each location on the surface of the workpiece where a pressure foot contacts the surface. The drilling point is located on the datum plane at the point where the drilling axis intersects the plane.

The gimbal member includes a surface that has a spherical portion which is defined by a radius that originates at the drilling point. The outer housing includes a bearing surface that is shaped to slide adjacent the spherical surface portion of the gimbal member. This provides a means for pivoting the inner housing, and the drill axis, relative to the outer housing when the pressure feet are placed against the workpiece surface.

A positioning means in the form of an automatic traversing drilling unit, a robot arm, a drill press, or the like is connected to the outer housing of the drilling apparatus. The positioning means moves the apparatus to various positions on a particular workpiece or workpieces for drilling holes therein. When the apparatus is positioned adjacent the workpiece the pressure feet first contact the workpiece surface which pivots the drilling axis and normalizes the drilling bit. A clamp-up means then thrusts the pressure feet against the surface of the workpiece with a certain preselected clamp-up pressure.

The clamp-up means may comprise first and second portions of the outer housing which are movable relative to each other. The first portion of the outer housing is connected to the positioning means. The second portion of the outer housing is connected to the bearing surface of the outer housing. An actuator means is provided for moving the second portion relative to the first, to in this manner cause the bearing surface to thrust against the spherical surface portion of the gimbal member. This thrust is transmitted through the gimbal member to the pressure feet which causes the pressure feet to abut against the workpiece surface with a certain clamp-up pressure or force. The actuator means may be in the form of an electric feed motor, a hydraulic actuator, or a pneumatic actuator. A thrust sensor may be mounted to the outer housing in operative position between the positioning means and the bearing surface of the outer housing so as to monitor the thrust provided by the clamp-up means. The thrust sensor could, for example, be in the form of a strain gauge mounted to the first portion of the outer housing. The thrust sensor would provide a means for adjusting the clamp-up pressure which the pressure feet apply to the workpiece surface.

The drive means, which rotates and advances the drill bit, includes a spindle shaft that is received within the inner housing. The spindle shaft includes a rotating portion, connected to the bit, and a nonrotating portion. The rotating portion is connected to a spindle motor which drives the bit in rotation. The nonrotating portion is connected to a feed motor which advances the shaft towards the workpiece. The rotating and nonrotating portions are connected together by a rotary thrust coupling member.

An important advantage to the present invention is that it provides a quick and easy means for drilling a bore normal to the surface of a workpiece.

Another advantage of the present invention is that it provides a means for clamping the drilling apparatus to a workpiece with sufficient force so that the apparatus will not translate relative to the workpiece surface as the bore is drilled. This has a number of effects. First, it eliminates drill skid. Second, it ensures that the bore will be drilled normal to the surface of the workpiece for its entire length. Third, when a countersink is provided in the bore, a sufficient clamp-up force will ensure that the countersink remains in concentric relationship relative to the drilling axis. Further, clamp-up pressure ensures that no gaps occur between multi strata in the workpiece which thereby eliminates burrs and chips between the layers. The amount of pressure applied also takes into account the structural stability of the workpiece itself.

Still another advantage to the present invention is that it provides a datum plane that may be used as a depth register for determining the depth of the bore as it is being drilled. This is important when drilling bores that, for example, have a countersink portion for receiving the head of a rivet or the like. It is critical to know the point at which to stop drilling the bore so that the rivet can fit into the bore with the rivet head being substantially flush with the surface of the workpiece.

Still another advantage to the present invention is that it is well suited for adaptation to computerized control. The rotation and advancement of the drilling bit for bore depth may be controlled by a computer. Likewise, control of clamp-up pressure may also be computer controlled.

BRIEF DESCRIPTION OF THE DRAWINGS

Referring now to the drawings, like reference numerals refer to like parts throughout the various views, and wherein.

BEST MODE FOR CARRYING OUT THE INVENTION

Figure 1:
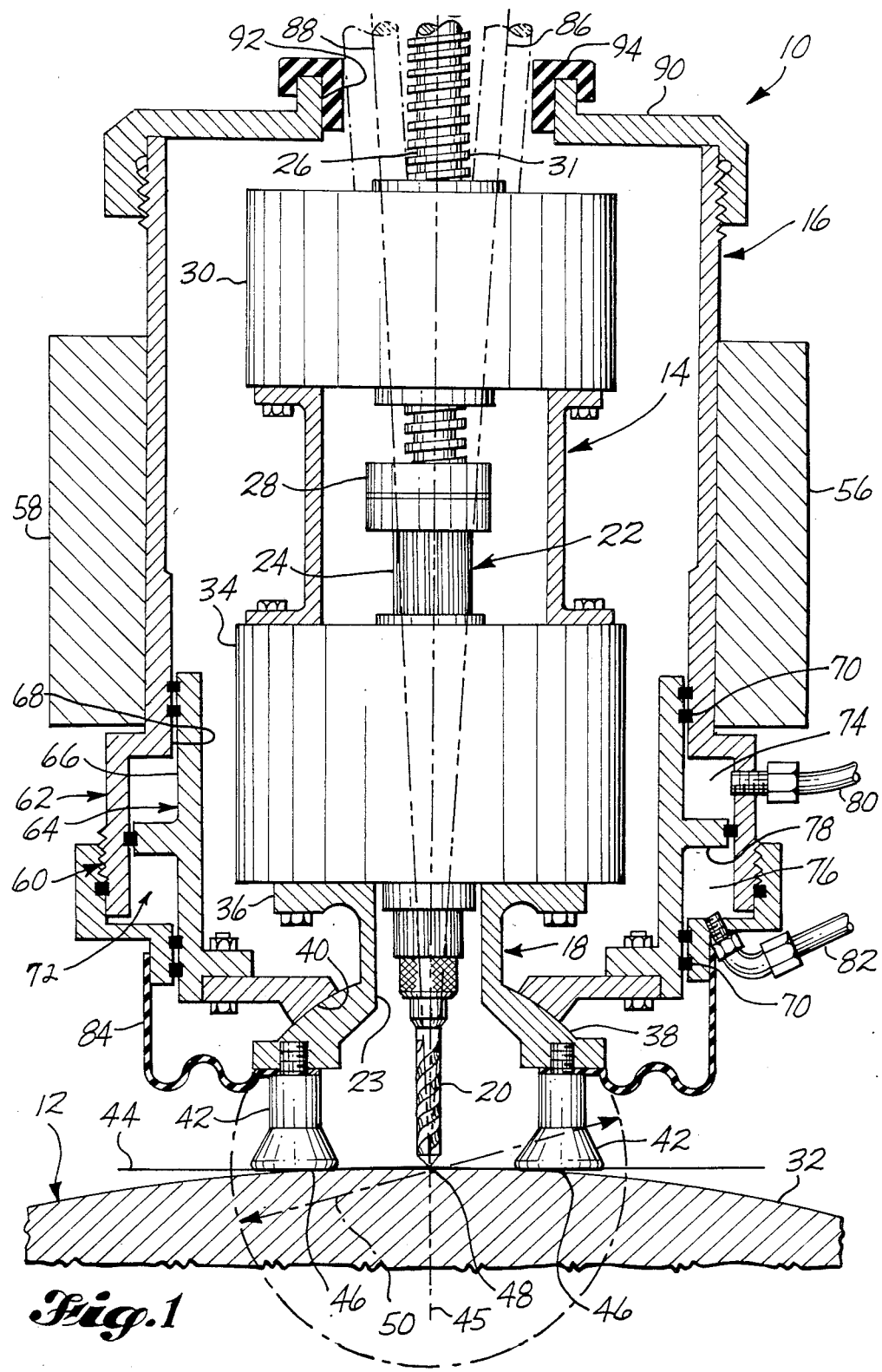
FIG. 1 is an elevational cross-sectional view of a drilling apparatus constructed in accordance with a preferred embodiment of the invention.

Referring now to the drawings, and first to FIG. 1, therein is shown at 10 a drilling apparatus constructed in accordance with a preferred embodiment of the present invention. The apparatus 10 is positioned adjacent a workpiece 12 for drilling a bore therein. In general form, the apparatus 10 includes an inner housing 14 that is connected to an outer housing 16 by a gimbal member 18. The inner housing 14 supports a drill bit 20 which is driven by a spindle shaft 22. The spindle shaft 22 is received within the inner housing and extends downwardly through an opening 23 in the gimbal member 18. The spindle shaft has a rotating portion 24 and a nonrotating portion 26 which are connected together by a rotary thrust coupling 28.

The upper portion of the inner housing 14 has a feed motor 30 connected to threads 31 on the nonrotating portion 26 of the spindle shaft 22. The feed motor 30 moves the spindle shaft 20 axially toward and away from the workpiece 12. In this manner, the drill bit 20 may be advanced toward and against the surface 32 of the workpiece 12 with a desired feed rate. The lower portion of the inner housing 14 includes a spindle motor 34 that is connected to a splined rotating portion 24 of the spindle shaft 22. Rotation of the rotating portion 24 causes the drill bit to rotate for the purpose of drilling a bore.

In FIG. 1, the gimbal member 18 is fixedly connected to the inner housing 14 by means of an annular, outwardly radiating flange portion 36, which is bolted to the casing of the spindle motor 34. The gimbal member 18 includes a portion 38 having a spherical surface. The outer housing 16 includes an annular bearing surface 40 shaped to slide adjacent the spherical surface portion 38 of the gimbal member 18. The sliding movement of the bearing surface 40 relative to the spherical surface 38 permits the inner housing 14 to pivot relative to the outer housing 16. This, of course, also permits the spindle shaft 22 and drill bit 20 to pivot.

Figure 7:
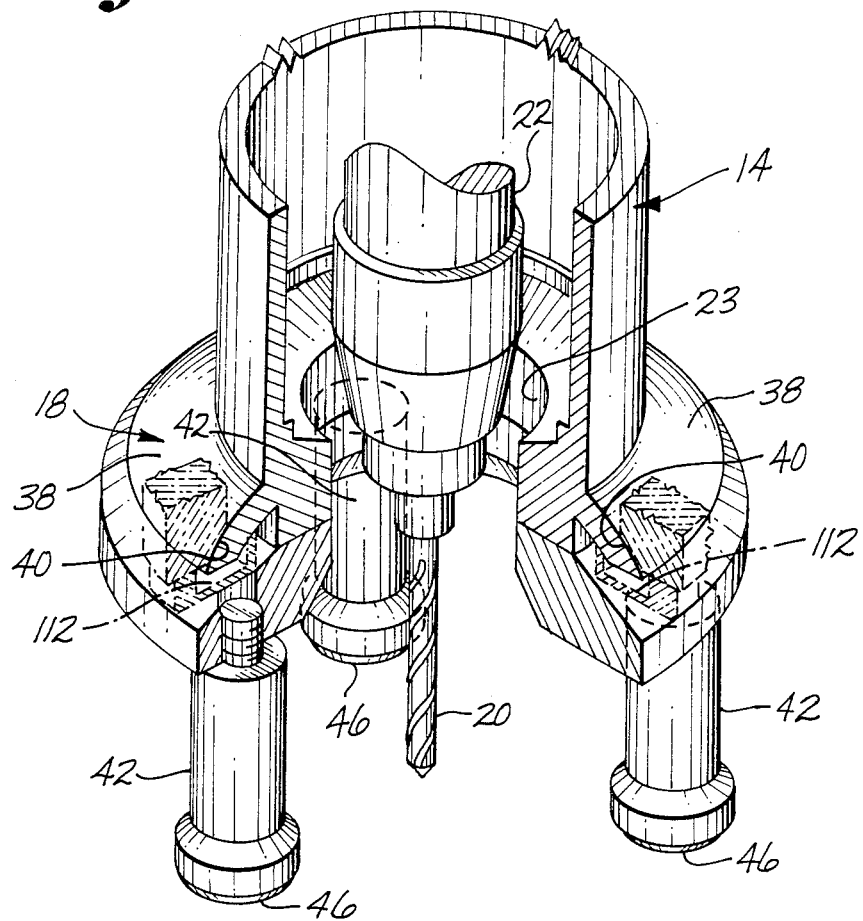
FIG. 7 is an enlarged fragmentary pictorial view, shown in partial section, of a gimbal member and pressure feet which form the lower portion of the drilling apparatus shown in FIGS. 4–6.
Figure 8:
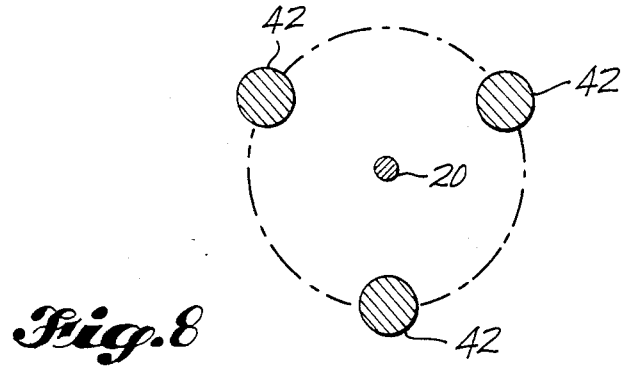
FIG. 8 is a cross-sectional view taken along line 8—8 in FIG. 4.

In preferred form, the gimbal member 18 includes three pressure feet 42 which extend downwardly from the gimbal member. The pressure feet 42 are spaced equidistant from each other and abut against the surface 32 of the workpiece 12. The longitudinal axis of the drill bit 20 (and the spindle shaft 22) is positioned centrally between the pressure feet 42. This is best shown in FIGS. 7 and 8, which illustrate a second embodiment of the invention that is to be described later.

A datum plane 44 is defined by the locations 46 where the pressure feet 42 contact the workpiece surface 32. The datum plane 44 intersects each location 46 where a pressure foot contacts the workpiece surface 32. The spherical surface portion 38 of the gimbal member 18 is defined by a radius 50 which originates at the point where the axis 45 of the bit 20 intersects the datum plane 44. This point of intersection defines a drilling point 48 for drilling a bore in the workpiece 12. Therefore, as can be seen from the drawings, the pressure feet 42 define a datum plane 44 which is substantially tangent to the surface 32 of the workpiece 12. The drilling point 48 for the bore is positioned on the datum plane 44 and therefore will also be substantially tangent to the surface 32. What this means is that as the apparatus 10 is positioned adjacent a workpiece, the pressure feet 42 will abut against the surface of the workpiece causing the inner housing 14 to pivot relative to the outer housing 16. Since the center of the gimbal member spherical portion 38 is located at the drilling point 48, such pivoting movement will also pivot the drill axis 45 into a position that is substantially normal to the workpiece surface. A person skilled in the art would realize that the combination of the spacing between the pressure feet 42 and the curvature of the workpiece surface 32 would affect the location of the datum plane 44 with regard to its tangency relative to the workpiece surface. However, proper spacing of the pressure feet 42 will result in a datum plane 44 that is positioned substantially tangent to the surface, resulting in a bore that is drilled substantially normal to the workpiece surface.

Figure 2:
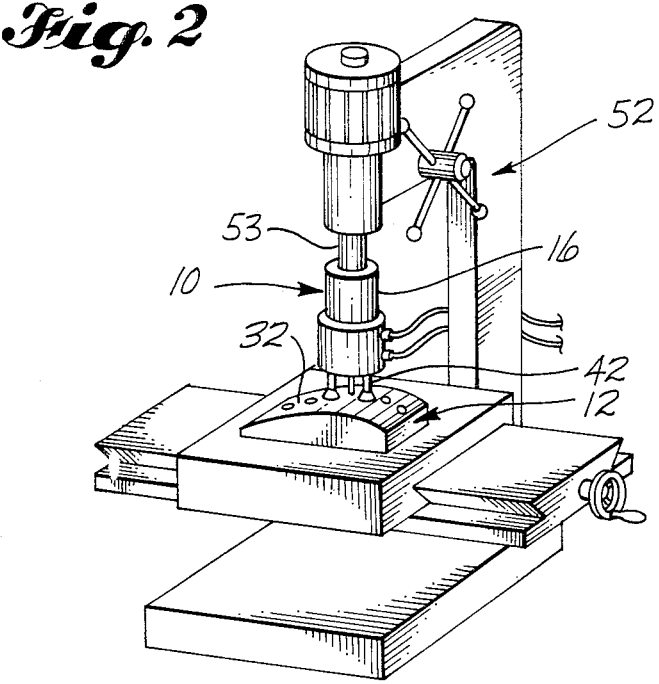
FIG. 2 is a pictorial view of a common drill press and shows the drilling apparatus of FIG. 1 mounted thereto for drilling a bore in a workpiece.
Figure 3:
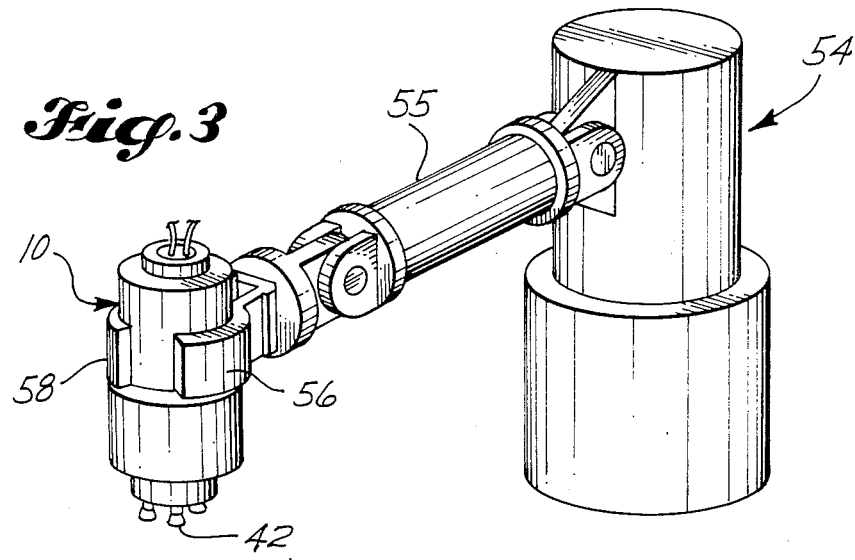
FIG. 3 is a pictorial view of a robot arm and shows the apparatus of FIG. 1 mounted to the end of the arm in such a manner so that the arm may be used to position the apparatus adjacent a workpiece.

The apparatus 10 shown and described herein is to be used in conjunction with some sort of means for positioning the apparatus adjacent a workpiece. For example, and referring now to FIG. 2, the apparatus 10 is well suited for adaptation to a standard drill press 52. The apparatus 10 is shown in this Fig. mounted to a spindle arm 53 which is vertically movable. Alternatively, and referring now to FIG. 3, the apparatus 10 could be used in conjunction with an automatically controlled robot 54. The robot 54 would have an arm portion 55 that grasps the apparatus 10 by means of gripping members 56, 58 for positioning the apparatus adjacent a workpiece. Referring back to FIG. 1, the apparatus 10 is shown wherein the outer housing 16 is held by the gripping members 56, 58 of the robot 54.

When the apparatus is positioned adjacent a workpiece, the pressure feet 42 first abut against the surface of the workpiece, thereby causing the drill axis 45 to assume a normal position relative to the workpiece surface 32. A pneumatic actuator, indicated generally by arrow 60, and constructed as a portion of the outer housing 16, may provide a clamp-up force for clamping the pressure feed 42 against the workpiece surface 32. A first portion 62 of the outer housing is connected to the gripping members 56, 58 of the positioning means. A second portion 64 of the outer housing is directly connected to the annular bearing surface 40, which slides adjacent the spherical surface portion 38 of the gimbal member 18. In preferred form, both the first and second portions are cylindrical members, wherein the outer sidewall 66 of the second portion is in sliding contact with the inner sidewall 68 of the first portion 62. The lower part of the first portion 62 projects radially outwardly so as to provide an annular chamber 72 between the outer sidewall 66 of the second portion 64, and the inner sidewall 68 of the first portion. The annular chamber 72 is divided by an outwardly projecting flange 78 that is connected to the outer sidewall 66 of the second portion 64 of the outer housing 16. This flange 78 separates the chamber 72 into upper and lower chambers 74, 76. Air inlet/outlet ports 80, 82 may be connected to each of the chambers 74, 76. By pressurizing the upper chamber 74 with air, the second portion 64 of the outer housing is thrust downwardly with respect to the first portion 62. This thrust is transferred by the bearing surface 40 onto the spherical surface portion 38 of the gimbal member, and is further transmitted to the pressure feet. The thrust provided by the actuator 60 therefore provides a clamp-up force that ensures that the apparatus 10 will remain in a stationary position relative to the workpiece surface 32 as the bore is drilled. For example, by having a sufficient clamp-up force, there will be little or no sideways translation of the drill bit 20 as the bore is drilled. In addition, if the workpiece comprises several layers of the material, the clamp-up force may be used to hold the several layers together as the bore is drilled. A seal 70 may be provided between the outer sidewall 66 of the second portion 64 and the inner sidewall 68 of the first portion 62 for preventing air leakage from the upper and lower chambers 74, 76.

In the embodiment shown in FIG. 1, when the apparatus 10 is moved away from the workpiece 12, the spherical surface portion 38 of the gimbal member 18 is held adjacent the bearing surface 40 of the outer housing 16 by means of a diaphragm spring 84. When the pressure feet 42 are not adjacent a workpiece the inner housing 14 is free to swing back and forth between the positions shown by the dashed lines 86 and 88. The top portion 90 of the outer housing 16 may be provided with an opening 92 through which the nonrotating portion 26 of the spindle shaft 22 extends. The opening 92 would provide a structural constraint limiting the amount of back and forth movement of the spindle shaft 22. The opening 92 may be covered with a rubber material 94 to prevent the spindle shaft 22 and/or the outer housing 16 from being damaged when the apparatus 10 is moved from position to position adjacent a workpiece, or when the apparatus is moved between different workpieces.

Another embodiment of the invention is shown in FIGS. 4-8. In this other embodiment, the apparatus 10 is shown mounted to an automatic traversing drilling unit, indicated generally by 96, wherein the apparatus 10 may be used to drill a series of holes in a body panel or the like. Such a traversing drilling unit was disclosed (Boeing Co. invention disclosure No. 81-0263) in a patent application filed on Feb. 13, 1984 under U.S. Ser. No. 772,297. The apparatus 10 is shown connected to a pair of carriages 98, 100 of the unit 96, wherein one carriage is positioned on each side of the apparatus. The apparatus 10 is attached to the carriages 98, 100 by means of outwardly extending linkage members or rods 102, 104.

Figure 4:
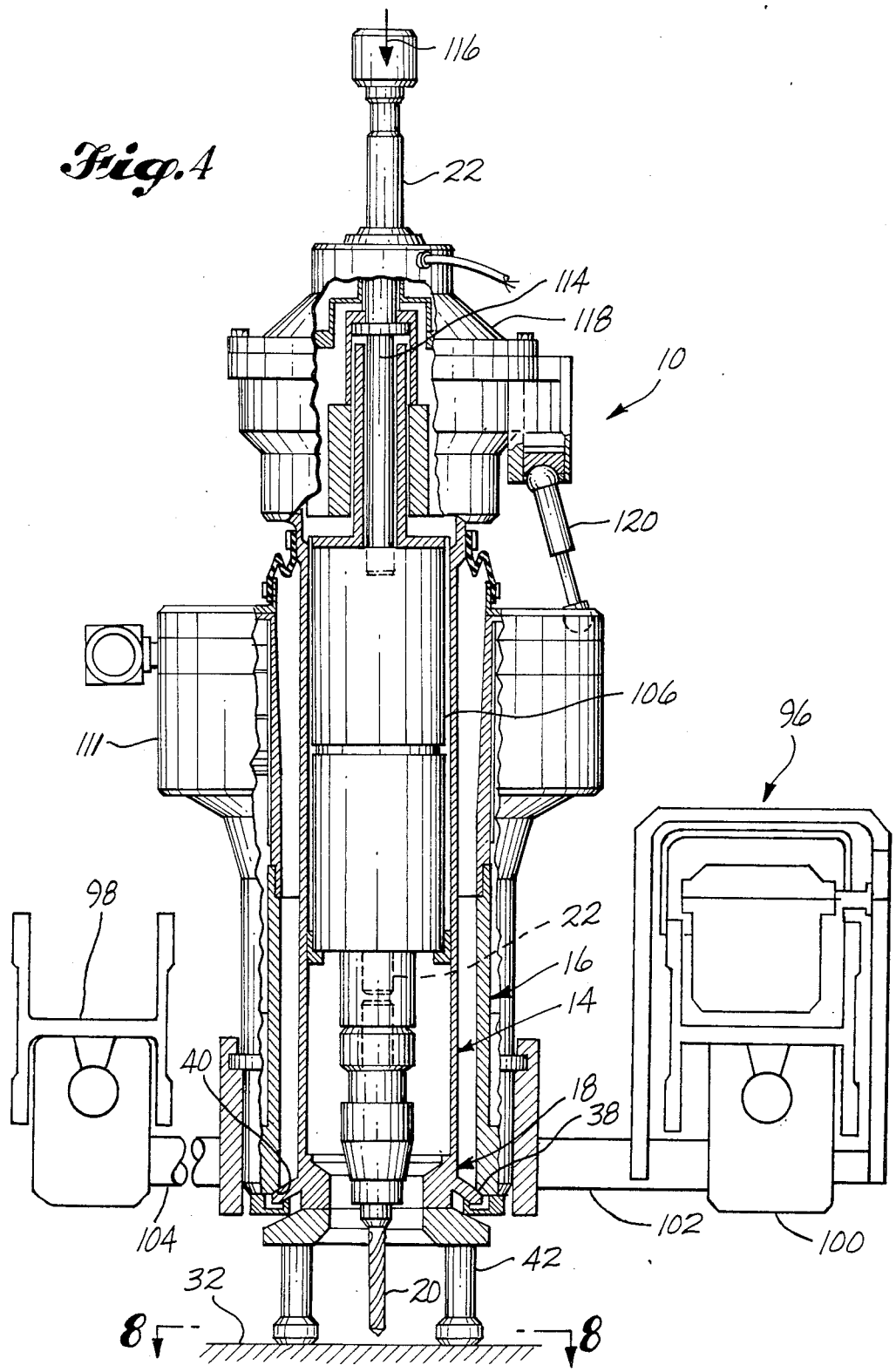
FIG. 4 is a view much like FIG. 1 but shows another embodiment of the drilling apparatus wherein the apparatus is shown mounted to carriages of an automatic traversing drilling unit.
Figure 5:
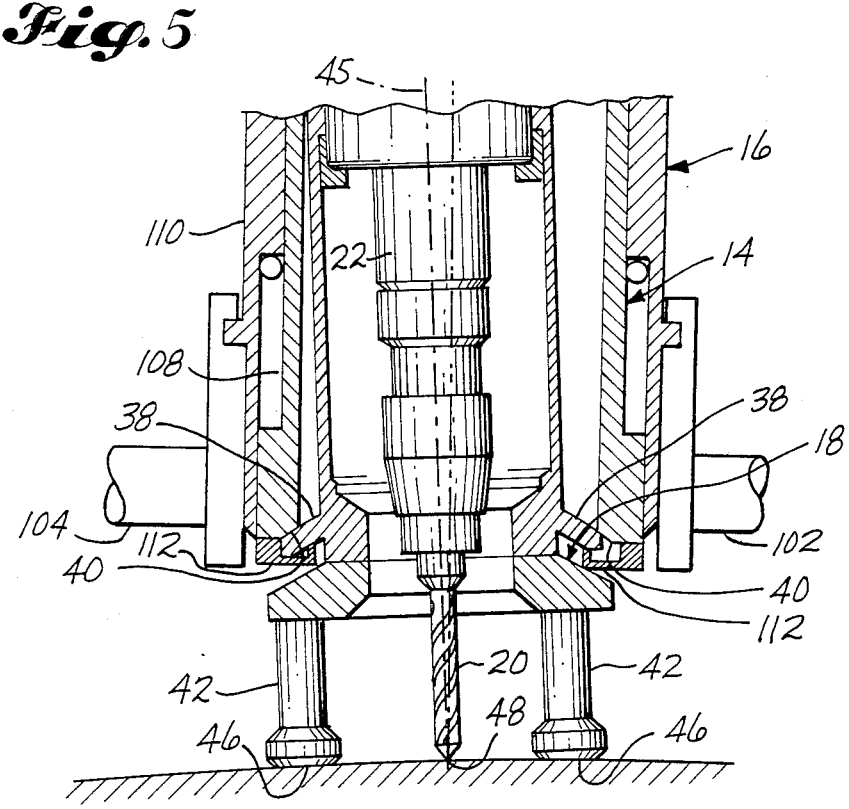
FIG. 5 is an enlarged fragmentary view of the lower portion of the drilling apparatus shown in FIG. 4, and shows the drill bit of the apparatus being normalized relative to the surface of a workpiece.
Figure 6:
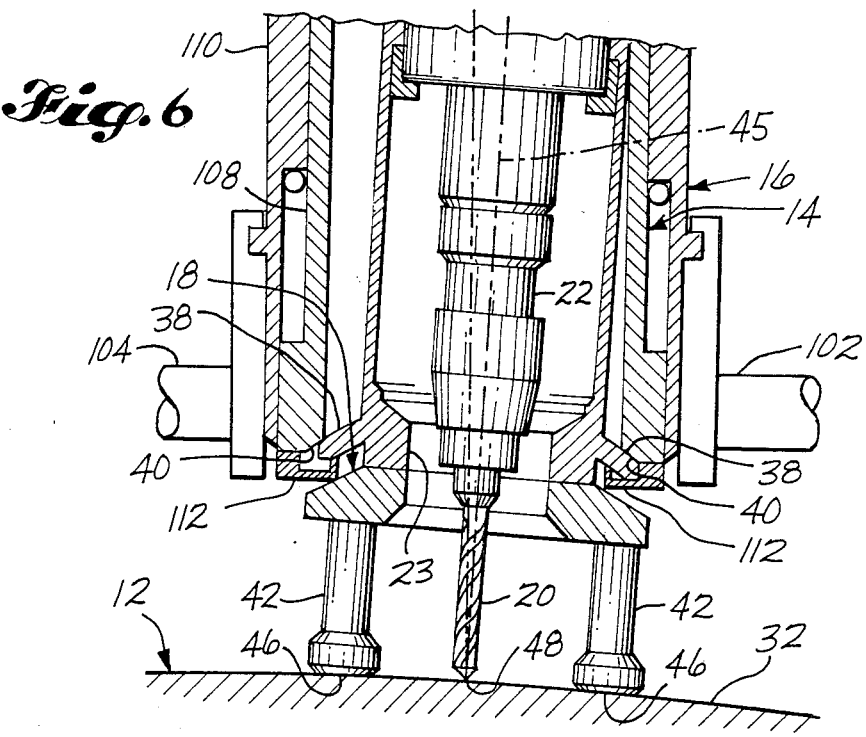
FIG. 6 is a view like FIG. 5 but shows the drilling bit being normalized for a workpiece surface having a different curvature than that shown in FIG. 5.

In basic form, the apparatus 10 shown in FIGS. 4-8 is the same as the apparatus shown in FIG. 1, with a few alterations. Referring now to FIG. 4, the apparatus 10 shown therein has the same gimbal member 18, with the gimbal member having a spherically shaped surface portion 38. The outer housing 16 is fixedly connected to the linkage rods 104 and 102 and therefore cannot move relative to the carriages 98, 100 of the traversing drilling unit 96. A clamp-up motor 111, which in this case may be in the form of a hollow nut electric motor, is connected to the first and second portions 110, 108 of the outer housing 16 in such a manner so that the clamp-up motor 111 may be operated to slide the second portion 108 relative to the first 110. Therefore, moving the second portion 108 downwardly relative to the first portion 110 would cause the bearing surface 40 to thrust against the spherical surface portion 38 of the gimbal member. This in turn would cause the pressure feet 42 to clamp-up against the surface 32 of the workpiece 12.

The embodiment shown in FIGS. 4-7 includes an annular support shoulder 112 which prevents the inner housing 14 from falling free of the outer housing 16 when the apparatus 10 is lifted away from the workpiece surface 32.

The drill bit 20 is driven in much the same manner as the embodiment shown in FIG. 1. In the later embodiment, however, the rotating portion of the spindle 22 is driven by an air driven motor 106. The spindle 22 is hollow for providing an air passageway 114 to supply air to the motor 106. Air for driving the motor 106 may be input through an end of the spindle shaft 22, which is indicated generally by arrow 116. The spindle shaft 22 is advanced toward the workpiece by an electric feed motor 118 mounted to the top portion of the apparatus 10. A linkage arm 120, connected to both the feed motor 118 and the clamp-up motor 111, prevents rotation of the feed motor 118 relative to the outer housing 16.

Although two embodiments of the invention have been presented and described above, a person skilled in the art would realize that other embodiments of the invention could be made without departing from the spirit and scope thereof. It is not intended that the invention shall be limited in any way by the above description. The spirit and scope of the invention shall be limited only by the appended claims which follow, in accordance with the established doctrines of patent claim interpretation.

What is claimed is:

1. A drilling apparatus comprising:
   a drilling member rotatable about an axis for drilling a bore in a workpiece;
   drive means for rotating said drilling member and for advancing said drilling member toward and against the workpiece to drill said bore;
   an inner housing that receives said drive means and supports said drilling member, and an outer housing that surrounds said inner housing;
   a gimbal member connecting said inner housing to said outer housing in a manner so that said inner housing may pivot relative to said outer housing, wherein said gimbal member is fixedly connected to said inner housing, with said gimbal member including a surface having a spherical portion defined by a radius that originates at a drilling point positioned on a datum plane, said datum plane being substantially tangent to said workpiece surface, with said outer housing including a bearing surface shaped to slide adjacent said spherical surface portion so that said gimbal member and said inner housing may pivot relative to said outer housing, to cause said drilling axis to pivot and to remain substantially normal relative to said drilling point while said bore is drilled.

2. The apparatus of claim 1, with said gimbal member having a plurality of pressure feet which abut against said workpiece surface, said pressure feet being arranged equidistant from each other, with said datum plane intersecting each location on said workpiece surface where a pressure foot contacts said surface, and with said drilling point being positioned on said datum plane centrally with respect to said feet.

3. The apparatus of claim 2, including positioning means, connected to said outer housing, for moving said drilling apparatus and for holding it adjacent said workpiece to drill a bore therein, and including clamp-up means for thrusting said pressure feet against said workpiece surface, wherein said clamp-up means thrusts said feet against said surface with a certain preselected clamp-up force.

4. The apparatus of claim 3, wherein said clamp-up means is operatively connected to said outer housing in a position between said positioning means and said bearing surface of said outer housing so that said clamp-up means may thrust said bearing surface against said spherical portion of said gimbal member, thereby causing said pressure feet to be thrust against said workpiece surface.

5. The apparatus of claim 3, wherein said drive means includes a spindle shaft connected to said drilling member, said shaft having a rotating portion that rotates about said drilling axis, and a nonrotating portion, wherein said nonrotating portion is connected to a feed motor for advancing said shaft towards said workpiece, such advancement causing said drilling member to advance toward and against said workpiece surface to drill said bore, and wherein said rotating portion is connected to a spindle motor, said spindle motor rotating said shaft to cause said drilling member to rotate, and
   a rotary thrust coupling member connecting said rotating portion to said nonrotating portion.

6. The apparatus of claim 5, wherein said clamp-up means is operatively connected to said outer housing in a position between said positioning means and said spherical bearing surface of said outer housing so that said clamp-up means may thrust said bearing surface against said spherical portion of said gimbal member, thereby causing said pressure feet to be thrust against said workpiece surface.

7. The apparatus of claim 6, wherein said clamp-up means comprises first and second portions of said outer housing, said first and second portions being movable relative to each other, wherein said first portion is connected to said positioning means, and wherein said second portion is connected to said bearing surface of said outer housing, and
   actuator means for moving said second portion relative to said first portion, to cause said bearing surface to thrust against said spherical surface portion of said gimbal member.

8. The apparatus of claim 7, wherein said actuator means comprises a hydraulic actuator operatively connected to said first and second portions in a manner so as to move said second portion relative to said first portion.

9. The apparatus of claim 7, wherein said actuator means comprises a pneumatic actuator operatively connected to said first and second portions in a manner so as to move said second portion relative to said first portion.

* * * * *